Figure 1:
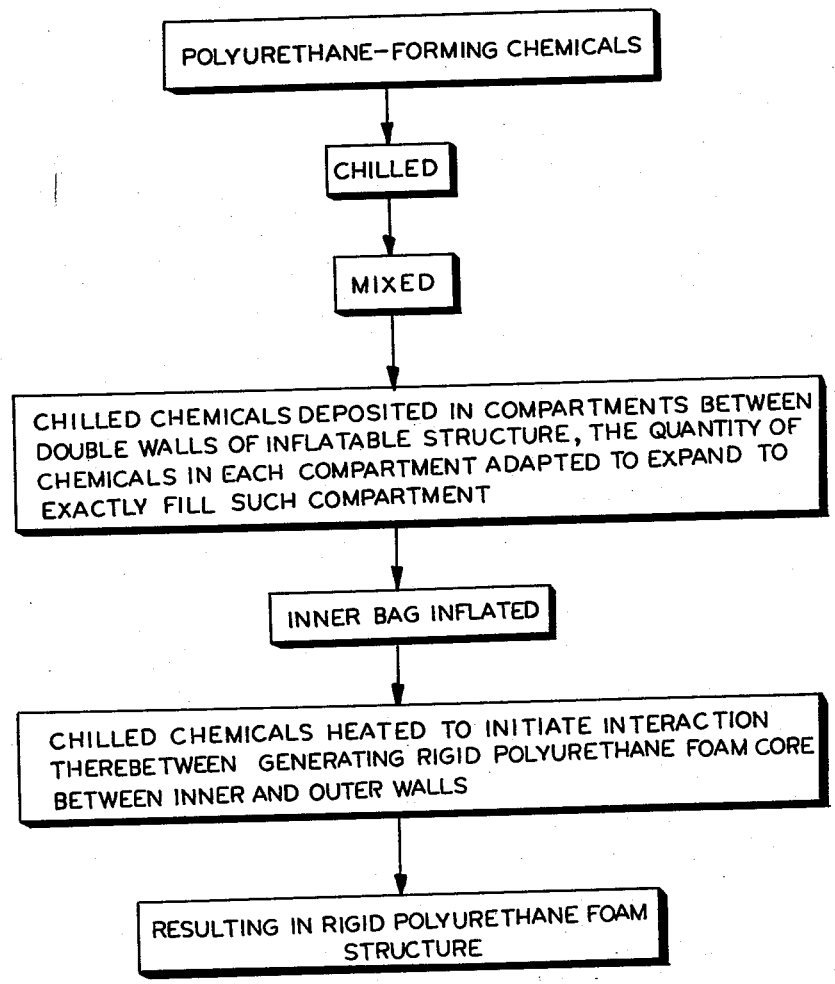

INVENTOR.
Walter D. Voelker
BY John R. Ewbank

ATTORNEY.

3,110,552
METHOD OF MAKING AN INFLATABLE
STRUCTURE
Walter D. Voelker, 950 Wellington Road,
Philadelphia, Pa.
Filed Sept. 23, 1959, Ser. No. 841,722
3 Claims. (Cl. 18—59)

This invention relates to a method of making plastic foam.

Heretofore industrial applications of plastic foams has required the use of expensive molds where forms or shapes are required. It has been especially difficult to construct formed pieces which have large hollow interior sections and a relatively thin wall of plastic foam. In addition to the cost and heavy weight of the molds, it has been found that their mass tends to absorb heat from the foaming plastic thereby tending to chill the foam and increase its density.

Heretofore plans for making outer space structures contemplate the transportation of suitable structural materials by rockets. These structural materials would be used in outer space in substantially the same form as when placed in the rockets which put them in orbit. As these disassembled structural pieces, because of their shapes, cannot be perfectly nested together; they occupy a relatively large volume and consequently require a large rocket to carry them to outer space, and hence require more rocket fuel than a smaller rocket that could carry the same material if they were in a compacted mass. The problem of making outer space structures is further complicated by the limited payload that can be transported by present rockets. Plans for large structures necessitate, with present technology, the use of several rockets that will carry components into orbit where they will later be brought together and assembled. There are, however, substantial difficulties in bringing together materials travelling in orbit in different paths at different speeds.

In accordance with the present invention, plastic foams are prepared by heating a reaction mixture capable of generating a plastic foam, said reaction mixture being maintained at a reduced temperature until the foaming action is desired. In certain embodiments of the invention, the components of a polyurethane foam are separately frozen to the solid state, pulverized, and mixed as the frozen powders, which remain inert until heated to initiate the generation of polyurethane foam.

In one embodiment of this invention, the materials are brought together mixed after they have been transported to the site of application, and in another embodiment of this invention, the materials are premixed, and are kept at a low temperature to delay chemical action until the reaction is desired. A form, bag or envelope of suitable material confines the materials while reacting so that when reaction is completed the materials will have the structural shape of said form, bag or envelope. For example, a cylinder, 40 feet long and 8 feet in diameter having 2 inch thick walls and ends of 2 pound per cubic foot urtheane foam the relative volume of the materials carried to the volume of the final cylindrical structure is approximately 1 to 300.

In the drawings,

FIG. 1 is a self-explanatory flow-sheet indicating the general nature of the method of the present invention.

Figure 2:
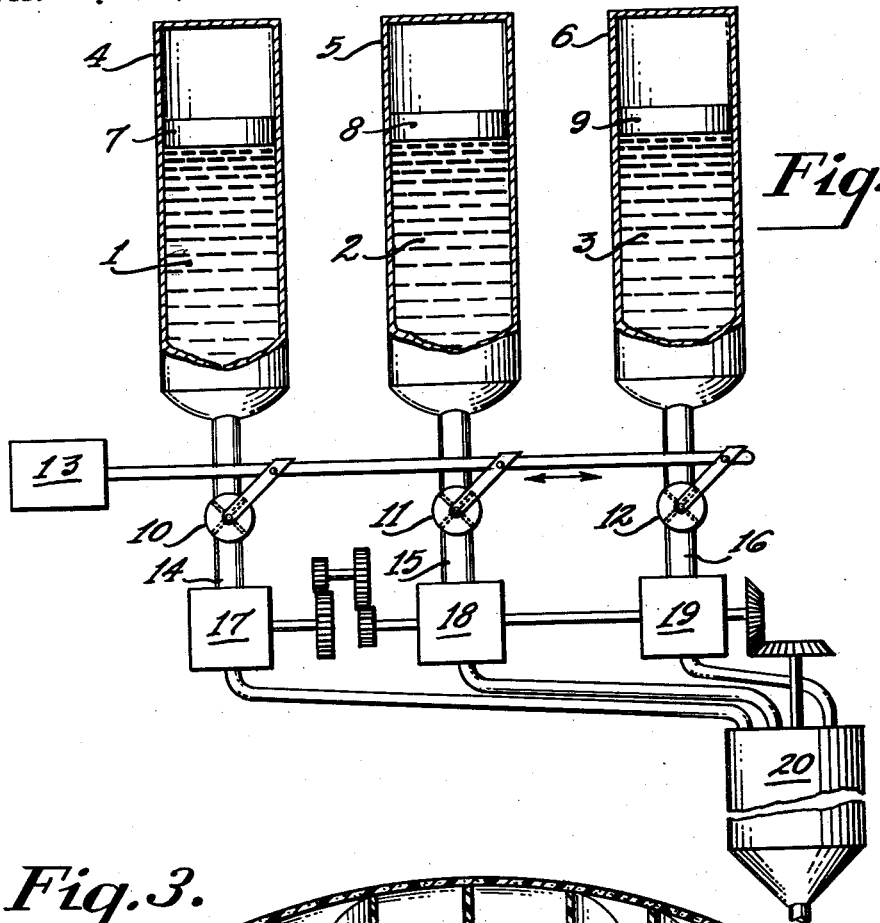

FIG. 2 schematically shows mixing apparatus.

Figure 3:
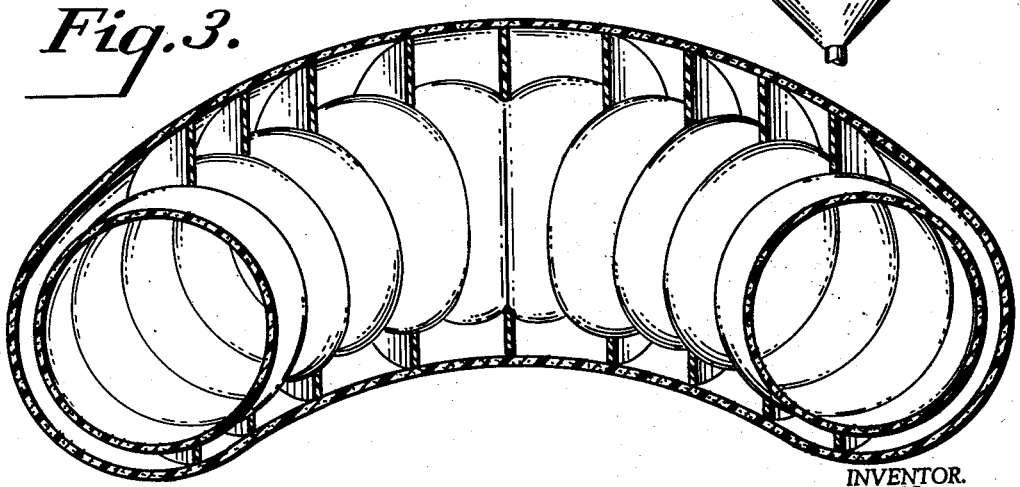

FIG. 3 schematically shows a hollow toroid.

In one embodiment of this invention illustrated in FIGURE 2, the chemicals 1, 2 and 3 are in separate storage containers 4, 5 and 6 which are partially filled, preferably about ¼ filled with compressed gas. To maintain the separation of the gas and liquid, free floating pistons 7, 8 and 9 are used, although other means for maintaining separation may be used such as entrapping the gas in a flexible bag. The tanks are individually connected to valve parts 10, 11 and 12 which are simultaneously operated by actuator 13. When the valve actuator 13 is actuated, the ports in valves 10, 11 and 12 are opened and the chemicals 1, 2 and 3 are forced out of the tanks by the pressure of the compressed air on the pistons 7, 8 and 9 and flow through pipes 14, 15 and 16 respectively to metering devices 17, 18 and 19 which in a preferred form are gear pumps mechanically coupled so that there is a constant relationship between the operating speeds. By the selection of gear pumps of suitable size and the proper choice of inter-coupling mechanism, in a preferred form a gear train is used, the flow of chemicals 1, 2 and 3 through pumps 17, 18 and 19 respectively is closely controlled. In a preferred form the pumps are driven by the pressure of the chemicals in the tanks, although as an alternate any powered device such as a spring actuated motor or electric motor may be used to drive the mechanically interconnected pumps. The chemicals 1, 2 and 3 flowing from the metering devices 17, 18 and 19 are brought into close proximity at junction box 20. The chemicals are then mixed, in a preferred form each chemical is passed through a small orifice so that an atomized spray is formed, said orifices being arranged so that sprays from the orifices intermingle and collectively impinge on the surface to be coated. In an alternate form, the chemicals 1, 2 and 3 are ported into a chamber containing a stirring device such as a bent wire, the opposite end of the chamber being opened so that the mixed materials may flow from the chamber. The stirring device may be operated by an independent motor or in a preferred arrangement may be driven by a mechanical coupling to the mechanism which interconnects the gear pumps 17, 18 and 19.

The inter-mixed chemicals are sprayed, poured or otherwise introduced into the form, bag or envelope to be coated or filled with foam.

A collapsed closed container similar to a double walled bag may be used and a metered amount of mixed chemicals 1, 2 and 3 is introduced through an entry port which is then closed. If desired, a vent may be provided at the far end of the bag to permit the escape of any gases in the bag or any gases escaping from the foam. The foam increases in volume, fills the bag and hardens whereupon the filled bag may be used as a structural member or if large enough as a complete structure. The bag may have any desired shape including but not limited to cylindrical, spherical, toroidal, conical or combinations of these. It is necessary for the inner bag to be supported against the pressure developed by the foam between the two bags tending to collapse the inner bag. This may be accomplished by rigid forms; by supporting the inner bag by fibers or webs affixed at intervals to the outer bag; or in a preferred form, by generating in the inner bag sufficient gaseous pressure to offset the pressure generated by the foam, about 0.1 to 5 pounds per square inch, or a combination of the above means of supporting the inner bag may be used.

In another embodiment of this invention, see FIGURE 3, a bag of the desired shape is formed, in a preferred form a toroid having a mean diameter of about thirty feet and a diameter of about 8 feet for a section of the toroid. This bag is of thin plastic film such as polytetrafluoroethylene or polypropylene or polyglycolterphthalate and may be reinforced with glass fiber, and consists of an inner toroidal bag surrounded by an outer toroidal bag, the bags being interconnected by web sections of a plastic or fabric material which divides the space between the two toroidal bags into separate compartments, each of which has its own charge of unfoamed chemicals 1, 2 and 3. In a preferred form, the interconnecting web sections are perforated so that small amounts of foam from adjacent compartments may intermingle to give added structural strength.

Instead of pumping the chemicals through a mixer at the time of foaming, the chemicals may be refrigerated, pre-mixed and then heated to reaction temperature.

The chemicals 1, 2 and 3 are first prepared and chilled until they become solids which are then pulverized. The pulverized chemicals are then mixed at low temperature. As an alternate, the chemicals 1, 2 and 3 may be cooled and then mixed as liquids at low temperature, and the mixtures maintained at low temperature to prevent any significant chemical reaction until the desired moment at which time the temperatures of the chemicals are raised and chemical action initiated.

Instead of mixing pulverized powders of frozen chemicals suitable for reacting to form polyurethane foam, certain embodiments of the invention employ strata of thin layers of frozen chemicals which react to form polyurethane foam when heated to a reactive temperature. Each of the chemicals is separately cooled and formed into a thin sheet; the sheets of thus cooled chemicals are interleaved to form a plurality of strata of cooled chemicals; the thus stratified structure is maintained at a reduced temperature to inhibit chemical reaction; and then at the desired time the stratified structure is heated to generate plastic foam by the interaction of the interleaved chemicals.

As an example of application to astronautics, the double toroidal bag with the mixed, but cooled chemicals is folded into a compact package after including in the inner toroidal bag a cylinder charaged with gas under pressure, or suitable gas generating chemicals. When the desired point in outer space has been reached the folded bag and accessories are ejected from the rocket container; immediately the charged gas cylinder or gas generating chemicals are activated so that the inner toroidal bag is inflated to assume its full toroidal shape, pressure relief valves being provided to vent any excess of gas that might rupture this bag. The chemicals 1, 2 and 3 are then heated sufficiently to initiate the chemical action after which time the exothermic heat of the reacting chemicals continues the reaction at a sufficiently rapid rate that the chemicals in each compartment will foam and completely fill the compartment before gelation and cross-linking of the chemicals is completed and a rigid structure is formed.

Other arrangements of this invention are possible and it may be used in industrial applications where the ambient pressure outside of a bag is less than the pressure in the bag or in making radomes or similar structures.

The chemicals described as 1, 2 and 3 may in practice consist of combinations of various chemicals. In some formulations, only two chemicals 1 and 2 would be required. In other formulations four or five chemicals or ingredients may be desirable. In a preferred formulation, the following chemicals are used.

| Component: | Amounts (parts by weight) |
| --- | --- |
| Tetraethyleneglycol | 100.00 |
| Tolylenediisocyanate | 82.0 |
| Water | 2.9 |
| Triethylenediamine | .4 |

Having thus described my invention, I claim:

1. The method of preparing a structure having sandwich walls which includes the steps of: preparing an inflatable inner envelope, said inner envelope being spaced from an outer wall by a plurality of webs, said inner envelope, webs and outer wall forming a plurality of separate compartments; placing in each of said plurality of compartments the exact amount of chilled, foam-forming chemicals adapted to react to form rigid polyurethane foam exactly filling said compartments when expanded; inflating the inner envelope; heating the chilled chemicals subsequent to such inflation of the inner envelope to develop the exact amount of rigid polyurethane foam in each of said compartments to provide a sandwich structure retaining the shape of the inflated inner envelope.

2. The method of preparing an astronautical habitation structure which includes the steps of: chilling a mixture adapted to form a polyurethane foam, the chemical components being present in the proportions adapted to form a rigid polyurethane foam; placing the chilled mixture in compartments defined by the combination of an inflatable inner envelope, an outer wall spaced from such inner envelope, and web members interconnecting the inner envelope and outer wall, each compartment containing exactly the quantity of chilled mixture adapted to exactly fill each expanded compartment inflating the inner envelope; thereafter heating the chilled mixture to initiate chemical reaction therebetween; and transforming the foam-forming mixture to rigid polyurethane foam core sandwiched between the inner envelope and outer wall, each compartment being expanded to exactly the correct amount by reason of the prior control of the quantity of chemicals in each compartment.

3. A method of making a hollow toroidal structure having sandwich walls characterized by a core of rigid polyurethane foam which includes the steps of: chilling each of the components of a polyurethane-forming mixture; mixing the chilled components to provide a chilled, nonreactive mixture; placing such chilled mixture in a plurality of compartments adapted to expand by the foaming of the polyurethane-forming mixture, the quantity of chilled mixture in each compartment being adapted exactly to fill such compartment without development of bursting pressure, said compartments being defined by an inner toroidal envelope, an outer toroidal wall, and a plurality of webs interconnecting such inner envelope and such outer wall, said inner envelope and outer wall consisting of glass-fiber reinforced organic plastic film, inflating the inner envelope to transform the compact package into a toroidal structure; heating the chilled chemicals in the compartments subsequent to such inflation of the inner envelope, such heating initiating the transformation of the chemicals into polyurethane foam; transforming the chemicals into rigid polyurethane foam, thereby filling each compartment with foam without development of bursting pressure, said structure being thus transformed into a structure having sandwich walls characterized by rigid polyurethane foam core.

References Cited in the file of this patent

UNITED STATES PATENTS

| 2,129,240 | Sanborn | Sept. 6, 1938 |
| 2,706,311 | Durst et al. | Apr. 19, 1955 |
| 2,764,565 | Hoppe et al. | Sept. 25, 1956 |
| 2,779,689 | Reis | Jan. 29, 1957 |
| 2,788,953 | Schneider | Apr. 16, 1957 |
| 2,898,626 | Alderfer et al. | Sept. 11, 1959 |
| 2,958,516 | Wall et al. | Nov. 1, 1960 |
| 2,983,636 | Runton | May 9, 1961 |
| 3,013,922 | Fisher | Dec. 19, 1961 |

FOREIGN PATENTS

| 211,422 | Australia | Oct. 14, 1957 |
| 720,956 | Great Britain | Dec. 29, 1954 |
| 537,295 | Canada | Feb. 19, 1957 |